United States Patent
Deul et al.

(10) Patent No.: US 10,196,865 B2
(45) Date of Patent: Feb. 5, 2019

(54) METHOD AND SYSTEM FOR LUBRICATING RISER SLIP JOINT AND CONTAINING SEAL LEAKAGE

(71) Applicant: Noble Drilling Services Inc., Sugar Land, TX (US)

(72) Inventors: Hans H. J. Deul, Richmond, TX (US); Patrick O'Neill, Houston, TX (US)

(73) Assignee: Noble Drilling Services Inc., Sugar Land, TX (US)

( * ) Notice: Subject to any disclaimer, the term of this patent is extended or adjusted under 35 U.S.C. 154(b) by 0 days.

(21) Appl. No.: 15/720,000

(22) Filed: Sep. 29, 2017

(65) Prior Publication Data

US 2018/0080290 A1    Mar. 22, 2018

Related U.S. Application Data

(63) Continuation of application No. PCT/US2015/023616, filed on Mar. 31, 2015.

(51) Int. Cl.
| | |
|---|---|
| *E21B 17/01* | (2006.01) |
| *E21B 19/00* | (2006.01) |
| *E21B 17/07* | (2006.01) |
| *F16N 7/40* | (2006.01) |

(52) U.S. Cl.
CPC ............ *E21B 19/006* (2013.01); *E21B 17/07* (2013.01); *F16N 7/40* (2013.01)

(58) Field of Classification Search
CPC ........ E21B 17/01; E21B 17/07; E21B 19/006; E21B 19/09
See application file for complete search history.

(56) References Cited

U.S. PATENT DOCUMENTS

| | | | | |
|---|---|---|---|---|
| 4,367,981 A | * | 1/1983 | Shapiro | E21B 7/128 166/355 |
| 4,610,161 A | | 9/1986 | Gehrig et al. | |
| 8,684,090 B2 | * | 4/2014 | Haugland | E21B 17/07 166/344 |
| 9,068,402 B2 | * | 6/2015 | Boisjolie | E21B 17/01 |
| 2006/0014462 A1 | | 7/2006 | Bailey et al. | |
| 2006/0144622 A1 | * | 7/2006 | Bailey | E21B 33/085 175/230 |
| 2008/0010543 A1 | | 5/2008 | Orbell et al. | |
| 2008/0105434 A1 | * | 5/2008 | Orbell | E21B 17/085 166/356 |

(Continued)

FOREIGN PATENT DOCUMENTS

| | | | | |
|---|---|---|---|---|
| WO | WO-2008051092 A1 | * | 5/2008 | ............ E21B 19/006 |
| WO | 2008088226 A1 | | 7/2008 | |

OTHER PUBLICATIONS

International Search Report and Written Opinion, International Application No. PCT/US2015/023616.

*Primary Examiner* — Matthew R Buck
(74) *Attorney, Agent, or Firm* — Richard A. Fagin

(57) ABSTRACT

A fluid containment system for a riser slip joint includes a fluid container sealingly engaged to a fixed part of the slip joint. A movable part of the slip joint is axially movably engaged with the fixed part. An annular seal is disposed between the fixed part and the movable part. A body of fluid disposed in the fluid container has a level selected to submerge the annular seal and at least a portion of the movable part. The system includes means for maintaining a level of the body of fluid substantially constant.

7 Claims, 2 Drawing Sheets

(56) References Cited

U.S. PATENT DOCUMENTS

2008/0271896 A1* 11/2008 Inderberg ............... E21B 17/07
                                                166/355
2013/0209175 A1   8/2013 Keyworth
2014/0360593 A1* 12/2014 Holtby .................... G05D 9/12
                                                137/312

* cited by examiner

METHOD AND SYSTEM FOR LUBRICATING RISER SLIP JOINT AND CONTAINING SEAL LEAKAGE

CROSS REFERENCE TO RELATED APPLICATIONS

Continuation of International (PCT) Application No. PCT/US2015/023616 filed on Mar. 31, 2017 the entirety of which is incorporated herein by reference.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

The present disclosure relates generally to the field of floating petroleum drilling and production systems. More specifically, the disclosure relates to methods and systems for lubricating seal elements in a riser slip joint and containing leakage that may occur in a seal element used in such slip joints.

Floating structures are known in the art for drilling wellbores in Earth formations located below the ocean floor, and for producing petroleum from such wellbores. The wellbores are typically drilled using fluid pressure control equipment, called a "blowout preventer" (BOP) affixed to the top of a casing cemented into a relatively shallow portion of the wellbore. A "riser", which is a pipe formed from segments coupled end to end, is affixed to the top of the BOP and extends therefrom to the floating platform. The riser may provide a conduit for fluids to move from the wellbore upwardly to the floating platform. Therefore a riser as used in wellbore drilling may form a conduit for drilling fluid and drill cuttings to be returned to the floating platform for processing and recirculation into the wellbore.

A riser is assembled to the wellbore from the floating platform by coupling together segments, called "joints" of riser, and moving the assembled "string" of joints of riser downward from the floating platform as successive riser joints are coupled to the string on the platform. The foregoing procedure continues until the riser is long enough to reach the wellbore from the floating platform, whereupon the lowermost end of the riser is coupled to the BOP.

For floating drilling platforms, a slip joint may be used between the upper end of the riser where it terminates on the platform and a fixed portion of the riser which terminates at a selected depth below the drilling deck of the floating drilling platform. The slip joint enables the riser length to change as the floating drilling platform changes with changes in elevation of sea level. A typical slip joint includes an outer pipe and an inner pipe that extends at least partway into the outer pipe. The inner pipe and the outer pipe are enabled to move axially with respect to each other. Typically, the outer pipe is connected to the upper end of the section of riser that extends to the BOP. The inner pipe moves within the outer pipe and is connected at its upper end to the floating drilling platform. Thus, the inner pipe moves up and down with the floating drilling platform. An annular seal may be provided between the inner pipe and the outer pipe to prevent escape of fluid from the annular space between the inner pipe and the outer pipe. It will be recognized by those skilled in the art that the respective placement and movement of the inner pipe and the outer pipe may be reversed from the configuration described above. An example of such a slip joint is disclosed in U.S. Pat. No. 8,973,674 issued to Leuchtenberg.

It has been observed that in slip joint and annular seal systems known in the art, the seal life may be limited because the seal tends to wipe the inner pipe's outer surface dry as it is extended outward from the annular seal. Seal failure is also known in the art. Either of the foregoing may result in spillage of drilling or other fluid disposed in the riser, creating an environmental hazard.

What is needed is an improved method and system to extend the life of an annular seal used in a riser slip joint and to prevent spillage into the sea of any fluid which may leak from a failed annular seal.

DETAILED DESCRIPTION

Figure 1:
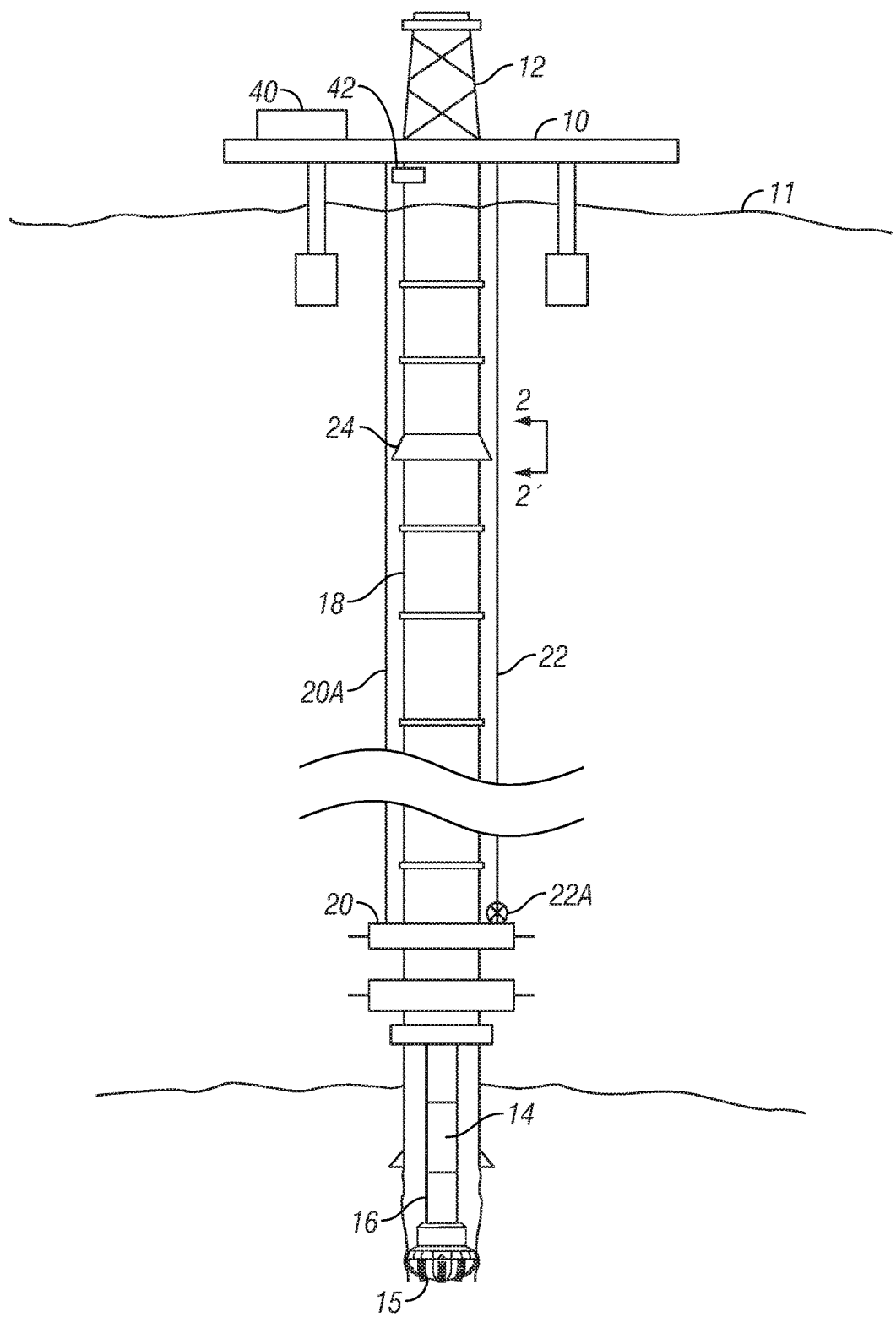
FIG. 1 shows a floating drilling platform drilling a wellbore in the Earth's subsurface below the bottom of a body of water including a riser slip joint.

Various embodiments of a system and method are explained herein in the context of drilling operations from a floating drilling platform. However, it should be clearly understood that methods and systems according to the present disclosure are also applicable to floating production systems, and thus, application of the method according to the present disclosure to drilling is not a limitation on the scope thereof. FIG. 1 shows a floating drilling platform 10, such as a semisubmersible drilling rig or a drill ship, on the surface of a body of water 11 such as the ocean as the platform is used for drilling a wellbore 16 in subsurface Earth formations 17 below the bottom 11A of the body of water 11. The wellbore 16 is drilled by a drill string 14 that includes (none of which shown separately) segments of drill pipe threadedly coupled end to end, various stabilizers, drill collars, heavy weight drill pipe, and other tools, all of which may be used to turn a drill bit 15 disposed at the bottom end of the drill string 14. As is known in the art, drilling fluid is pumped down the interior of the drill string 14, exits through the drill bit 15, and is returned to the platform 10 for processing. A riser 18 connects the upper part of the wellbore 16 to the floating platform 10 and forms a conduit for return of the drilling fluid. Wellbore fluid pressure control equipment, collectively referred to as a blowout preventer (BOP) and shown generally at 20 includes sealing elements (not shown separately) to close the wellbore 16 below the BOP 20 in the event closing the wellbore 16 becomes necessary. The BOP 20 may be controlled from the platform 10 by suitable control lines 20A known in the art.

In the present embodiment, the riser 18 may include auxiliary fluid lines such as a booster line 22 coupled near the BOP end thereof or to the BOP 20 selectively opened and closed by a booster line valve 22A. The booster line 22 forms another fluid path from the platform 10 to the wellbore 16 at a depth proximate the BOP 20. The riser 18 also includes therein a riser slip joint 24 of any type well known in the art, such as may be obtained from Cooper Cameron, Inc., Houston Tex. The riser slip joint 24 may be disposed in the riser 18 at a selected depth below the drilling deck (not shown separately) of the drilling platform 10.

A system controller 40 and a fluid storage tank 34 may be disposed on the drilling platform 10. The system controller 40 and fluid storage tank 34 will be further explained with reference to FIG. 2.

Figure 2:
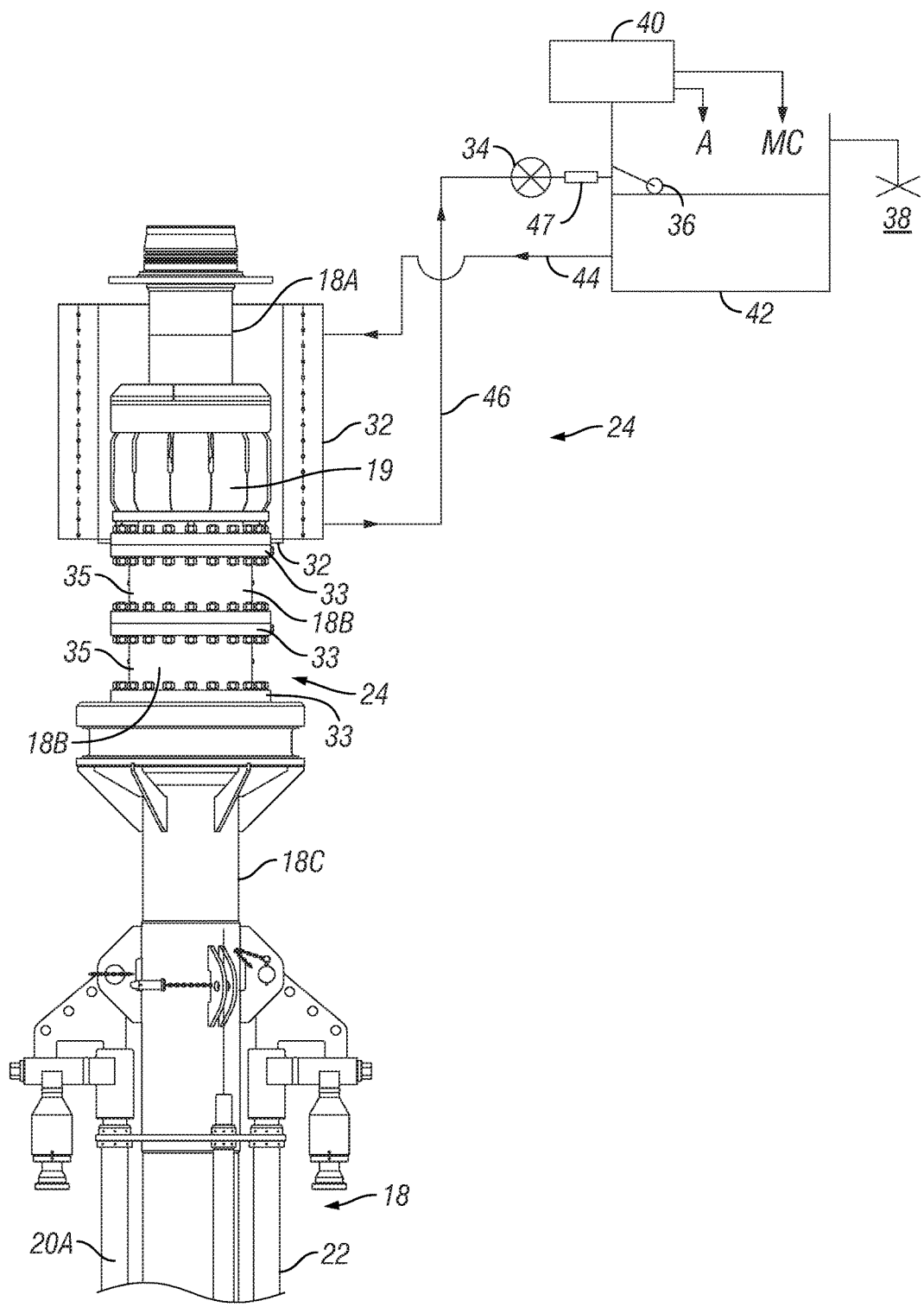
FIG. 2 shows a more detailed view of the riser slip joint, and an example fluid container and a fluid level maintenance system.

FIG. 2 shows the slip joint 24 of FIG. 1 in more detail along with components of a fluid containment system according to various aspects of the present disclosure. An upper end of the riser 18 may be terminated with a flange 33 of any type known in the art. Short riser segments 35 may be coupled together and to the riser 18 by corresponding flanges 33. The short riser segments 35 may be used to position an annular seal assembly 18B at a selected depth below the deck of the drilling platform (10 in FIG. 1). The upper end of the riser may include a tensioner ring 30 for coupling tensioner cables (not shown) in a manner known in the art. The control line 20A and booster line 22 are shown terminated in respective couplings that may be formed as part of or be positioned adjacent to the tensioner ring 30. Connections between the control line 20A and the booster line 22 and equipment on the platform (10 in FIG. 1) are omitted from FIG. 2 for the sake of clarity of the illustration.

The annular seal assembly 18B seals an annular space between the interior of the slip joint 24, which in the present embodiment may be an outer tube 18C formed by the short riser segments 35, and an inner tube 18A of the slip joint 24. The annular seal assembly 18B may be any type known in the art for use with a riser slip joint. See, for example U.S. Pat. No. 8,973,674 issued to Leuchtenberg as set forth in the Background section herein.

The inner tube 18A may terminate proximate the deck of the drilling platform (10 in FIG. 1) for returning drilling fluid to the platform. In other embodiments, the riser 18 may contain a different fluid than the drilling fluid and having different specific gravity or may have drilling fluid or other fluid maintained at a selected level below the drilling platform by the use of a separate drilling fluid return line (not shown) having a mud lift pump. Such fluid and/or fluid level may be used for the purpose of maintaining a selected pressure in the wellbore (16 in FIG. 1). See, for example, U.S. Pat. No. 7,938,190 issued to Talamo et al.

A selected length of the inner tube 18A extending from the annular seal assembly 18B and fluid seal assembly 19 disposed at an upper end of the annular seal assembly 18B may be disposed in a fluid container 32. The fluid container may be in sealed engagement at a lower end thereof to the base of the annular seal assembly 18B, for example on one of the connecting flanges 33. The fluid container 32 may be open at its upper end. Thus, the fluid container 32 may hold in place a selected volume of fluid by preventing its escape through the lower end thereof. A level of fluid in the fluid container 32 may be selected such that the entire annular seal assembly 18B and at least part of the inner tube 18A extending from the annular seal assembly 18B are submerged in fluid. In one example embodiment, the fluid may be drilling fluid. A fluid discharge line 46 may be in fluid communication with the fluid container 32 proximate a lower end thereof. The fluid discharge line 46 may be coupled to an inlet of a fluid pump 34, for example a two speed, electric motor operated centrifugal or positive displacement pump. A discharge of the fluid pump 34 may be directed to a storage tank 42 for storing a selected volume of the fluid. A fluid inlet line 44 may extend from proximate a base of the fluid tank 42 to proximate an upper end of the fluid container 32. In some embodiments, a bottom of the fluid tank 42 and a bottom of the fluid container 36 may be disposed at a same elevation so that absent any pumping of fluid from the fluid container 36 to the fluid tank 42, the fluid container 36 and the fluid tank 42 will have fluid levels maintained approximately at a same elevation by gravity.

A float or other type of fluid level sensor 36, for example, an acoustic level sensor or capacitance-type fluid level sensor may be disposed in the fluid tank 42 as shown in FIG. 2 or in the fluid container 32. Signals from the fluid level sensor 36 may be communicated to the controller 40. The controller 40 may be implemented in any known form, e.g., as a microprocessor, programmable logic controller, application specific integrated circuit, field programmable gate array, or even a simple electromechanical relay system. The controller 40 may include a separate or integral high power output (not shown) depending on the configuration of the controller 40 to selectively operate the pump 34 (e.g., by supplying current to an electric motor driving the fluid pump 34) so that a fluid level in the fluid container 32 is maintained while fluid may be circulated between the fluid container 32 and the fluid tank 42. A filter 47 may be disposed between a discharge of the fluid pump 34 and the fluid outlet in the fluid tank 42 so that the fluid is cleaned prior to entering the fluid tank 42 for circulation back into the fluid container (such as by gravity).

The fluid level in the fluid container 32 may be directly measured if the fluid level sensor 36 is disposed therein or may be inferred by a measured fluid level in the fluid tank 42 if the fluid level sensor 36 is disposed as shown in FIG. 2. In ordinary circumstances, when the annular seal assembly 18B is functioning correctly, the fluid pump 34 may be switched off or may operate at a low speed such that a fluid level in the fluid container 18B is maintained substantially constant. If the annular seal assembly 18B fails or leaks to any appreciable degree, the fluid level in the fluid container 32 may rise. In such case, the measured fluid level, if the fluid level sensor 36 is disposed in the fluid container 32, or the level in the tank 42 is the fluid level sensor is disposed therein may rise because of the increased hydrostatic head in the fluid container 32. In such cases, the controller 40 may automatically operate the fluid pump 34 at a higher speed so that the fluid level in the fluid container 32 stops increasing. If the fluid entry into the fluid container 32 is such that a capacity of the fluid tank 42 is exceeded by reason of withdrawal of excess fluid from the fluid container 32 (by suitable operation of the pump 34), an overflow line 38 may extend to a larger storage tank (not shown) or to a drilling fluid storage tank (not shown) on the drilling platform (10 in FIG. 1). The overflow line 38 may prevent spillage of fluid from the fluid container 32, thus preventing discharge of leaking fluid from the fluid container 32 from being discharged into the sea below the floating platform (10 in FIG. 1).

In some embodiments, the controller 40 may operate and alarm A such as may be observed or heard by a human operator on the drilling platform (10 in FIG. 1) or located elsewhere. The operator may use a manual control MC in signal communication with the controller 40 to change operation of the pump 34 to maintain the fluid level in the fluid container 32 in the event of fluid leakage.

Although the slip joint 24 shown in FIG. 2 is a conventional type wherein the movable part comprises the inner tube 18A and the outer tube thereof is coupled to an upper end of the fixed portion of the riser, it will be appreciated by those skilled in the art that a fluid container and fluid level maintenance system according to the present disclosure may have the outer tube form the movable part of the slip joint and the inner tube be coupled to the fixed portion of the riser (that is, the portion that extends to the BOP proximate the water bottom. For purposes of defining the scope of the present disclosure, it is only necessary that the slip joint have a movable part extending from the slip joint to the floating platform, a fixed part coupled to an upper end of the riser and an annular seal disposed between the fixed part and the moving part. Other components as described with reference to FIG. 2 may be the same in such embodiments of a slip joint.

A fluid storage container sealingly engaged around a riser slip joint and having fluid level control devices as explained herein may provide a means for lubricating exposed portions of the slip joint (i.e., the sections of the movable part which become exposed when pulled axially outward from the annular seal) to extend life of the annular seal and to prevent spillage into the sea of fluid that may leak past a partially or totally failed annular seal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fluid containment system for a riser slip joint, comprising:
   a fluid container sealingly engaged to a fixed part of the slip joint;
   a movable part of the slip joint axially movably engaged with the fixed part;
   an annular seal disposed between the fixed part and the movable part, a portion of the movable part extending from the annular seal and a portion of the fixed part disposed within the fluid container;
   a body of fluid disposed in the fluid container having a level selected to submerge the annular seal and at least the portion of the movable part; and
   means for maintaining the level of the body of fluid substantially constant.

2. The system of claim 1 wherein the means for maintaining comprises a pump disposed between an outlet of the fluid container and a fluid storage tank, a controller for operating the pump at a selected rate and a fluid level sensor for measuring a level of fluid, the controller configured to operate the pump to maintain the measured level substantially constant.

3. The system of claim 2 wherein the controller operates the pump automatically in response to measurements made by the fluid level sensor.

4. The system of claim 1 wherein the movable part comprises an inner pipe at least partially disposed within an outer pipe forming the fixed part.

5. The system of claim 1 wherein the fixed part is coupled to an upper end of a portion of a riser extending from the slip joint to a blowout preventer proximate a bottom of a body of water.

6. The system of claim 1 wherein the movable part extends from the slip joint to a floating drilling platform.

7. The system of claim 1 wherein the body of fluid comprises drilling fluid.

* * * * *